SIGNAL OPERATED AUTOMATIC COLOR KILLER SYSTEM

Filed April 28, 1955 2 Sheets-Sheet 1

INVENTOR.
LEONARD DIETCH
BY
ATTORNEY

Sept. 29, 1959 L. DIETCH 2,906,814

SIGNAL OPERATED AUTOMATIC COLOR KILLER SYSTEM

Filed April 28, 1955 2 Sheets-Sheet 2

INVENTOR.
LEONARD DIETCH
BY [signature]
ATTORNEY 2,906,814

SIGNAL OPERATED AUTOMATIC COLOR-KILLER SYSTEM

Leonard Dietch, Haddonfield, N.J., assignor to Radio Corporation of America, a corporation of Delaware Application April 28, 1955, Serial No. 504,503

4 Claims. (Cl. 178—5.4)

The present invention relates to circuitry for automatically switching between two modes of operation and, more particularly, to new and improved apparatus for automatically disabling the chrominance circuits of a color television receiver upon the reception of black and white television signals.

In accordance with the standards promulgated by the Federal Communications Commission on December 17, 1953 for the transmission and reception of color television information, luminance or brightness information regarding elemental areas of the televised image is transmitted by way of amplitude-modulation of a carrier wave, while information regarding the hue and saturation of the image areas is conveyed by phase-and amplitude-modulation of a color subcarrier wave whose frequency is spaced a fixed amount from the video carrier wave frequency. In order to detect the color information, it is necessary to provide some form of demodulating apparatus, which, according to proposed systems, may comprise synchronous demodulating circuits which serve to compare the incoming color subcarrier wave with the output wave of a color reference oscillator, thereby furnishing simultaneously information regarding the phase and amplitude of the received subcarrier wave. In view of the importance of cooperation between transmitter and receiver in such a system, the color reference oscillator must be synchronized with extreme accuracy so that it produces a wave of the same frequency and phase as that developed at the transmitter. Such synchronism is accomplished by the periodic transmission of a "burst" of signal wave equal to the frequency of the color subcarrier wave. A detailed description of the use of bursts for color synchronization may be found in an article entitled, "NTSC Color-TV Synchronizing Signal" which appeared in the February 1952 issue of Electronics, published by McGraw-Hill Publishing Company, Inc. The burst of subcarrier wave frequency is superimposed on the "back porch" of each horizontal blanking pulse.

In order that the receiving apparatus designed for color television image reproduction may also serve to reproduce high quality black and white pictures when receiving ordinary monochrome television signals, the receiver may be arranged in such manner as to arrest or disable the color demodulating circuits when monochrome television signals are being received. Such disabling of the chrominance channels (i.e., the color demodulating channel) of a color receiver during the reception of black and white image signals has been found necessary in order to prevent spurious color beat patterns from appearing in the monochrome reproduction as a result of random demodulation of high frequency picture and noise components appearing in the color channel. As mentioned, the color synchronizing bursts are employed at the receiver in synchronizing the locally produced reference subcarrier wave with the transmitter subcarrier wave. This synchronization may be brought about through the agency of a color AFC circuit for comparing the phase of the sync bursts with the phase of the locally produced wave to derive a correction voltage for controlling the frequency and phase of the oscillator which produces the reference wave at the receiver. It is desirable that synchronization of the receiver's color reference oscillator have been effected before the chrominance channel is activated, in order to prevent the production of spurious color information pending such synchronization.

It is, therefore, a primary object of the present invention to provide new and improved automatic color channel disabling means.

Another object of the invention is the provision of automatic color channel disabling means, the operation of which is correlated with the action of the receiver color synchronizing circuitry.

In general, the present invention comprises a color killer circuit (i.e. color channel disabling means) capable of operating upon a chrominance signal channel of a color television receiver in one of two fashions. That is, a killer circuit can provide a first output potential for biasing "off" the chrominance channel during reception of a black and white signal, for example, and a second output potential for rendering the chrominance channel operative during the reception of a color television signal. In accordance with the invention, the action of the color killer circuit is correlated with that of the color AFC arrangement of the receiver, so that the chrominance channel is maintained in a disabled condition until the AFC circuit has effectively synchronized the local color reference oscillator with the received subcarrier wave. As will become apparent, the present invention affords the advantage of improved noise immunity.

Additional objects and advantages of the present invention will become apparent to those skilled in the art from a study of the following detailed description of the accompanying drawing, in which.

Figure 1:
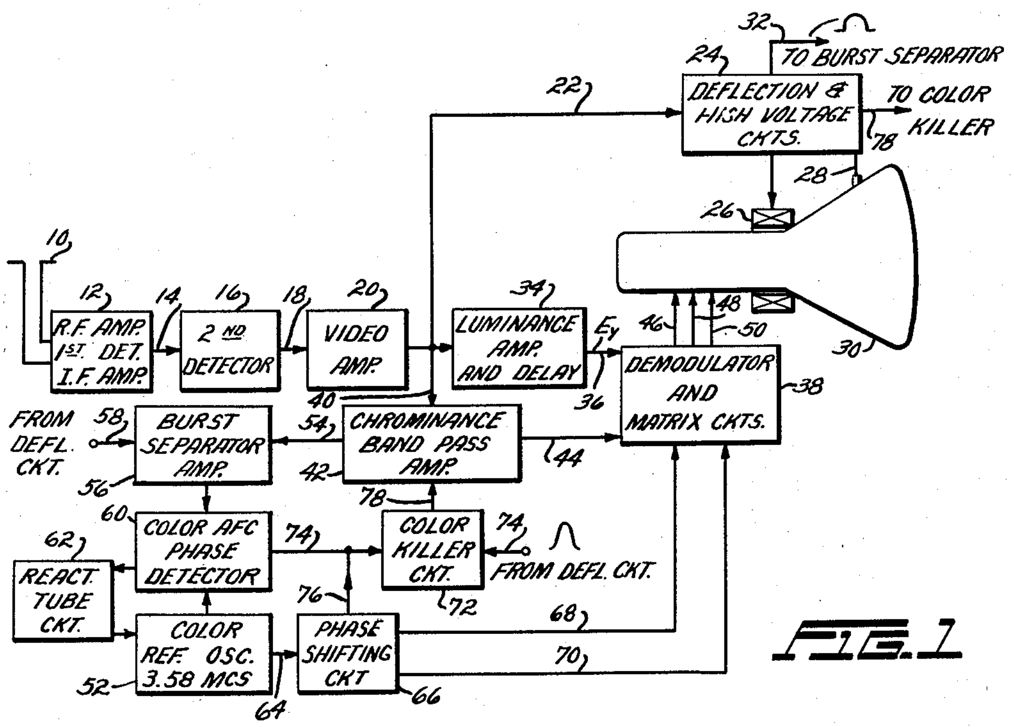
Fig. 1 illustrates, by way of a block diagram, a color television receiver embodying the present invention.

Referring to the drawing and, particularly, to Fig. 1 thereof, there is shown a block diagram of a color television receiver in connection with which the present invention may be employed. An incoming carrier wave, amplitude-modulated by the composite color television signal including luminance and chrominance components and color sync bursts, is intercepted by an antenna 10 and is applied to a tuner section 12 which includes radio frequency amplification stages, a mixer or first detector wherein the modulated carrier wave is translated in frequency to an intermediate frequency and an intermediate frequency amplifier. The amplified IF signals are applied via a lead 14 to a second or video detector 16 which provides at its output terminal 18 the detected composite color television signal.

The composite signal thus recovered from the video detector 16 is amplified in a broad band video amplifier stage 20 and is applied simultaneously to several channels of the receiver, as follows:

The signal is applied via a lead 22 to the deflection and high voltage circuits 24 comprising suitable means for generating scanning sawtooth current waves of television line and field frequencies for application to the electromagnetic deflection yoke 26. In a well-known manner, the flyback voltage pulses produced in the horizontal deflection circuit are rectified to produce a high, unidirectional positive potential for application via a lead 28 to the final anode of the tricolor kinescope 30. Also produced by the deflection circuits 24 and provided at the terminal 32 are burst gating pulses derived from the horizontal flyback pulses and having a duration corresponding substantially to that of the color synchronizing burst referred to above. The gating pulses may be produced, for example, through the agency of a flyback winding on the horizontal deflection output and high voltage transformer forming a part of the horizontal deflection circuit.

The luminance signal component of a composite received television signal is applied from the video amplifier 20 to a luminance amplifier and delay circuit represented by the block 34 which provides at its output terminal 36 the luminance signal $E_y$ for application to the demodulator and matrix circuits 38.

The composite color television signal is also applied from the video amplifier via a lead 40 to a chrominance bandpass amplifier 42 which serves to separate the subcarrier wave or chrominance signal information from the composite signal and to amplify the same. The amplified chrominance signal is, in turn, applied via a lead 44 to the demodulator and matrix circuits 38 which may be understood as performing a process of synchronous demodulation upon the chrominance signal to derive therefrom the "color-difference" signals employed in modulating the phase and amplitude of the subcarrier wave at the transmitter. The matrix, specifically, may combine the luminance signal with the color difference signals to provide individual color-representative signals for application via the leads 46, 48 and 50 to the beam intensity-controlling electrodes of the kinescope 30. A detailed discussion of the operation of such circuitry may be found in an article entitled, "Color Television Signal Receiver Demodulators" by D. H. Pritchard and R. N. Rhodes in the June 1953 issue of the RCA Review. The demodulating action requires the provision of subcarrier frequency waves of fixed phase with respect to a reference, which waves may be derived from a color reference oscillator 52 which produces a continuous 3.58 mcs. wave and synchronized as to phase and frequency by the color synchronizing bursts accompanying the composite signal. Specifically, the composite signal is applied from the chrominance bandpass amplifier 42 via a lead 54 to a burst separator or gating circuit 56 which receives from the terminal 32 of the deflection circuits burst gating pulses which are applied thereto via the terminal 58. The separated color synchronizing bursts are employed in synchronizing the operation of the color reference oscillator 52 through the use of an AFC phase detecting arrangement 60 which provides a D.C. control voltage to a reactance tube circuit 62 connected in circuit with the oscillator 52 for controlling its frequency.

The output wave from the oscillator 52 is applied via a lead 64 to a phase shifting circuit 66 which provides, at its output leads 68 and 70, subcarrier waves of fixed phase with respect to the phase of the reference burst for application to the demodulators and matrix contained within the block 38. Through the process of synchronous demodulation described above, the circuit 38 produces the color difference signals R—Y, G—Y and B—Y, where R, G and B represent the component color signals and Y represents the luminance signal. The color difference signals may be combined with the luminance signal in the circuitry 38, as shown, or may be applied to different electrodes of the kinescope 30 for combination therein in a known manner. In either event, the intensities of the respective electron beams of the kinescope are controlled in accordance with the component colors of the image being reproduced.

As thus far described, the apparatus illustrated in Figure 1 is of generally conventional form and need not be described further. For specific circuitry, reference may be made to a book entitled, "Practical Color Television for the Service Industry," Revised Edition, April 1954, Second Edition, First Printing, published by the RCA Service Company, Inc., a Radio Corporation of America subsidiary. It is also to be noted that, as described, the apparatus of Fig. 1 is capable of reproducing either color television images or monochrome images, depending upon the presence or absence of a phase- and amplitude-modulated color subcarrier wave in the received signal. As has been stated, color television signals of the standard variety include the color synchronizing bursts, which bursts are absent from a black and white signal. In order that the color signal processing channel including the chrominance amplifier 42 and demodulator circuitry 38 may be operative for the detection of color information during the reception of a color television signal but inoperative when monochrome television signals are being received, the additional apparatus of Fig. 1 is provided, in accordance with the present invention. The block 72 bearing the legend "color killer circuit" receives signals via the leads 74 and 76 from the phase detector 60 and phase shifting circuit 66, respectively, and provides at its output lead 78, for application to the chrominance bandpass amplifier 42, a control voltage capable of selectively rendering the amplifier 42 operative or inoperative. Such action of the color killer circuit 72 is based upon reception at its input lead 74 a positive going flyback pulse 76 from the lead 78 of the deflection and high voltage circuit 24, and in a manner to be described more fully hereinafter.

In general, the operation of the color killer circuit 72 of Fig. 1 is as follows:

When, during the reception of a color television signal including color sync bursts, the AFC phase detector 60 is operative to render the operation of the oscillator 52 in synchronism with the received bursts, an indication of such fact is presented to the color killer circuit by reason of the application thereto of the bursts and a phase of the color subcarrier wave from the circuit 66. The output signal of the color killer circuit 72 in such case is a positive voltage for application as a bias to a bandpass amplifier 42, which bias renders the bandpass amplifier 42 conductive.

On the other hand, when the signal being received is a black and white signal lacking the color sync bursts or when the AFC circuit 60 has not properly synchronized the oscillator 52, the color killer circuit 72 will provide a less positive (i.e., negative) bias to the bandpass amplifier 42 for disabling the same, and, therefore, the chrominance channel.

Figure 2:
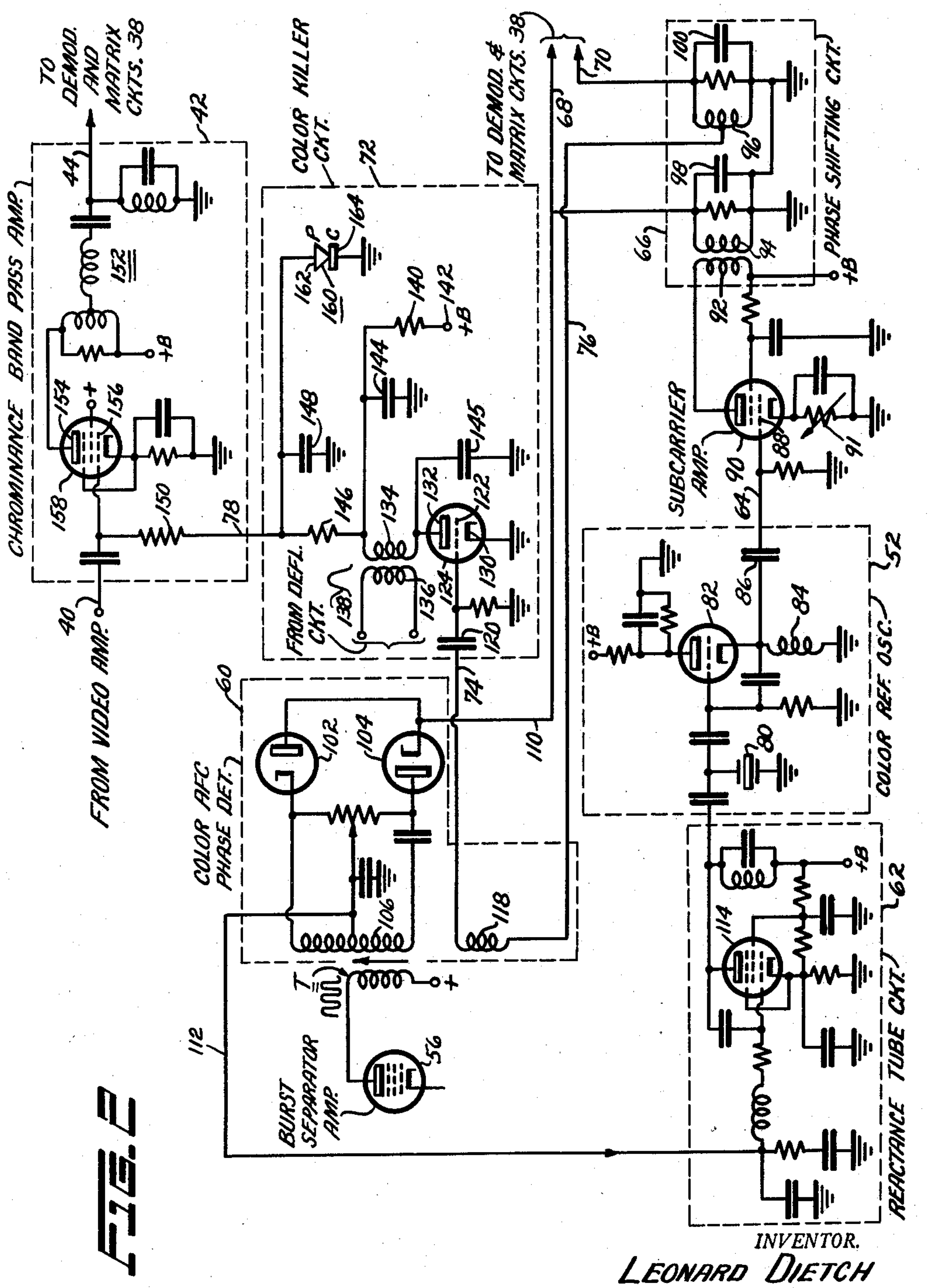
Fig. 2 is a schematic circuit diagram illustrative of the invention.

In order that the operation of the color killer circuitry of the present invention may be better understood, specific circuitry of a generally conventional nature for performing the AFC, oscillator, reactance tube and phase-shifting operations of Fig. 1 is illustrated schematically in Fig. 2. Reference numerals identical to those employed in connection with Fig. 1 are used in Fig. 2 to represent corresponding elements. The color reference oscillator 52 is a conventional crystal oscillator employing a crystal 80 having a resonant frequency equal to that of the subcarrier frequency (i.e., 3.58 mcs.). The output wave produced by the oscillator tube 82, which has in series with its anode-cathode current path a tuned inductance 84, is coupled via a capacitor 86 to the control electrode 88 of a subcarrier amplifier tube 90 which includes a variable cathode resistor 91 to permit adjustment of the amplitude of its output wave. The anode load circuit of the amplifier 90 includes the primary winding 92 of a transformer having first and second tuned secondary windings 94 and 96. The windings 94 and 96 and their respective tuning capacitors 98 and 100 constitute, by virtue of their respective couplings with the winding 92, the phase shifting circuit for providing, at the leads 68 and 70, selected phases of the locally produced color reference subcarrier wave. The leads 68 and 70 are designated for connection, as shown, to the demodulator and matrix circuits wherein the reference waves are employed in the detection of the chrominance information.

The separated and amplified color synchronizing bursts provided by the stage 56 are applied via the transformer T to the color AFC phase detector shown within the dotted line rectangle 60. The phase detector 60 comprises the serially connected diodes 102 and 104 which receive, via the center tapped secondary winding 106 of the transformer T, opposite phases of the separated burst information. A version of the selected phase of the subcarrier wave present in the winding 94 of the phase shifting circuit is applied via the lead 110 to the junction of the diodes 102 and 104. In the operation of the phase detector circuit, there is provided at its output lead 112 a direct current voltage whose polarity and amplitude are, respectively, indicative of the direction and amount by which the phase of the color reference oscillator wave as indicated by the wave at the lead 110 varies from that of the color synchronizing burst phase. This direct current control voltage is applied to the control electrode of the tube 114 of the reactance tube circuit 62. The reactance tube circuit is of conventional form and furnishes a reactive impedance in shunt with the oscillator crystal 80 for controlling the resonant frequency of the oscillator circuit in a known manner. It will thus be understood that, through the agency of the phase detector 60 and the reactance tube circuit 62, the phase and frequency of the wave produced by the color reference oscillator 52 are accurately controlled.

Figure 3:
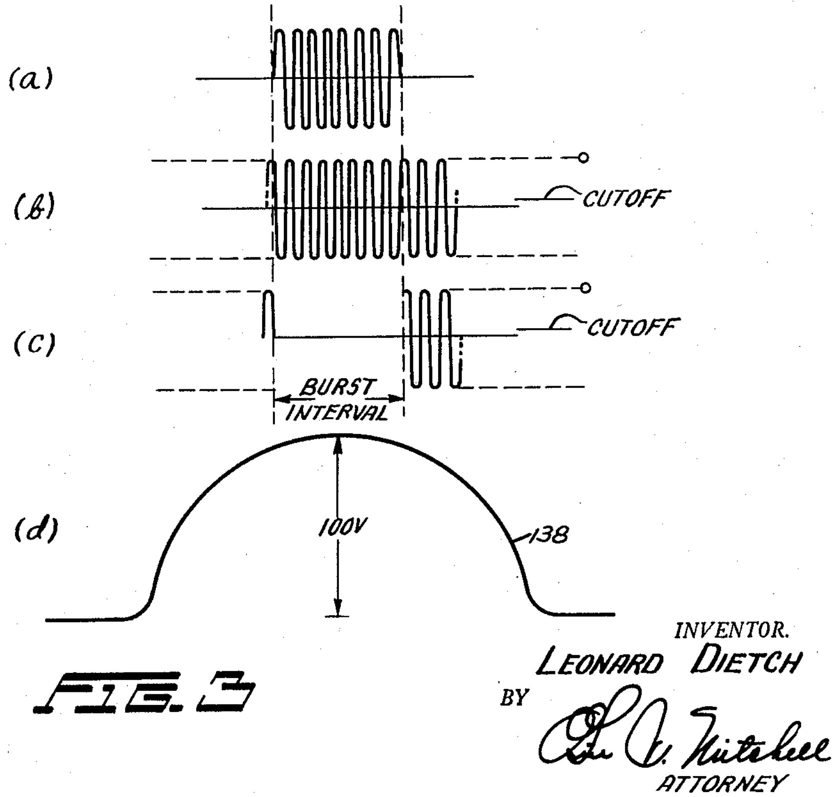
Fig. 3 shows certain voltage waveforms to be described in connection with the apparatus of Fig. 2.

With the foregoing in mind, the circuitry and operation of a specific form of color killer circuit in accordance with the present invention will now be described. An auxiliary secondary winding 118 forming a part of the transformer T is connected, at one end, via a capacitor 120 to the control electrode 122 of the color killer triode 124, and, at its other end, to a tap intermediate the ends of the winding 96 of the phase shifting circuit. The couplings of the windings 118 and 96 with their respective primary windings are so adjusted as to provide at the control electrode 124 voltage waveforms such as those shown by the curves *a*, *b* and *c* of Figure 3. Specifically, curve *a* of Fig. 3 illustrates the separated color synchronizing burst voltage induced in the winding 118. Curve *b* of Fig. 3, on the other hand, is illustrative of the continuous subcarrier frequency wave available at the lead 76 which is connected to a tap on the winding 96. As will be noted from Fig. 3, the continuous wave is, when the AFC arrangement is properly operating, of the same amplitude as but of the opposite phase from the color synchronizing bursts. It will, therefore, be understood that, when the local color reference oscillator is properly synchronized, the color synchronizing burst and a continuous wave will effectively cancel each other in the lead 74 which is connected via the capacitor 120 to the control electrode of the color killer tube. This condition is illustrated by waveform *c* of Fig. 3 wherein, as shown, the burst interval is devoid of color subcarrier frequency energy.

The cathode 130 of the color killer tube is connected to a point of fixed reference potential (e.g. ground), while its anode 132 is connected to one end of a winding 134 which is coupled to a portion 136 of the deflection output transformer of the horizontal deflection circuit (block 24 of Fig. 1). The flyback voltage pulses produced in the horizontal output transformer induce corresponding pulses 138 in the winding 134, as indicated in Fig. 2 and as shown by curve *d* of Fig. 3. The end of the winding 134 remote from the anode 132 of the color killer tube is connected through a resistor 140 to a terminal 142 at which there is available a source of positive operating potential (e.g., 300 volts) and is connected to ground via a decoupling capacitor 144. Also included in circuit with the anode 132 of the color killer tube is a decoupling capacitor 145 and a filter network comprising the resistor 146 and capacitor 148 whose junction is connected via the lead 78 to the grid leak resistor 150 of the chrominance bandpass amplifier 42. The amplifier 42 is of conventional form and is connected to provide at its output lead 44 the amplified chrominance (i.e., subcarrier) information for application to the demodulator and matrix circuits 38. It may be noted briefly that the chrominance bandpass amplifier itself is adapted to receive the composite color television signal from the video amplifier 20 via the lead 40 and includes a bandpass filter 152 having a center frequency of 3.58 mcs. in circuit with its anode 154.

The operation of the color killer circuit 72 will now be described. As an aid in simplifying the description, it will be assumed that the terminal 142 is connected to ground, rather than to a source of plus B potential (e.g., 300 volts). The continuous wave (curve *b* of Fig. 3) of 3.58 mcs. energy from the subcarrier oscillator 52, which wave is applied to the control electrode 122 of the color killer tube 124 via the lead 74, is rectified in the grid circuit of that tube. That is, the control electrode 122 and cathode 130 serve as anode and cathode of a rectifier to produce grid rectification. Such rectification produces a negative bias at the control electrode of, for example —25 volts with respect to ground, which voltage biases the tube 124 several volts beyond cutoff, as shown in Fig. 3(*b*).

During the reception of a black and white broadcast signal (i.e. one which lacks the color synchronizing burst), the positive-going half cycles of the continuous 3.58 mcs. wave applied to the control electrode 122 will render the tube 124 conductive in a pulsed fashion. During the color burst synchronizing interval of each television line period, the winding 134 associated with the horizontal deflection output transformer receives a positive pulse 138 (Fig. 3(d)). Thus, the triode 124 serves as a diode rectifier during each of the positive going half cycles of the 3.58 mcs. energy on its control electrode. Such diode action causes rectification of the positive flyback pulses 138 to produce across the filter network comprising the capacitors 144 and 148 and resistor 146 a negative voltage appearing at the lead 78 which may be, for example, —50 volts with respect to ground. This voltage is applied via the grid leak resistor 150 to the control electrode 156 of the chrominance amplifier tube 158, thereby biasing that tube beyond cutoff and preventing operation of the chrominance channel.

When, on the other hand, the received television signal includes color synchronizing bursts and the color AFC arrangement including the phase detector circuit 60 and reactance tube circuit 62 is properly operating so that the color sync bursts are of the same amplitude as the continuous wave but displaced therefrom in phase by 180°, cancellation of the 3.58 mcs. energy at the grid of the tube 124 will occur, as shown by curve *c* of Fig. 3. By reason of such cancellation of the continuous wave energy by the burst voltage, the bias on a control electrode 122 of the color killer tube remains beyond the cutoff point of that tube, since there are no positive-going half cycles of 3.58 mcs. energy to render the tube conductive, as explained above. By reason of such decreased conductivity of the triode 124, its diode rectification action on the flyback pulses 138 is substantially decreased so that the voltage at the lead 78 becomes less negative, reaching, for example, a potential of —25 volts with respect to ground (as opposed to the —50 volts with respect to ground set forth above).

The foregoing description illustrates the manner in which the color killer tube circuit serves to provide a more negative voltage at the lead 78 during the reception of a black and white signal from which bursts are lacking and a less negative voltage during reception of a color signal having bursts when the AFC arrangement has caused the local color reference oscillator to be properly synchronized.

In order to shift the "reference" of the bias voltage developed at the lead 78 by the color killer tube, the terminal 142 is, as shown, connected to a source of positive voltage and current flowing from the terminal 142 through the resistor 140 and the tube will produce a voltage drop tending to cancel the negative voltage drop produced by flyback pulse rectification. Such drop may be adjusted to be of such value as to shift the reference voltage by 25 volts, so that the biases developed during black and white and color signal reception, respectively, are −25 volts and zero volts. The zero bias developed at the lead 78 is sufficiently positive to render the chrominance bandpass amplifier tube 58 properly conductive for the amplification of the chrominance signal.

The anode circuit of the color killer tube 124 includes, in addition to the elements recited above, a diode 160 having an anode 162 and cathode 164, connected as shown, which performs the function of limiting the positive voltage swing at the lead 78 to ground potential. It will be appreciated, therefore, that the bias on the chrominance amplifier tube 158 is prevented from becoming more positive than zero volts, so that overloading of the amplifier tube 158 is effectively prevented.

The time constant of the filter circuit comprising the resistor 146 and capacitors 144 and 148 in circuit with the anode of the color killer tube is chosen to maintain the voltage at the lead 78 over a sufficiently long period with respect to a television line interval. Moreover, the capacitors 144 and 148 serve, together with the resistors 140 and 146, as decoupling networks for the prevention of the application of flyback pulses to the chrominance amplifier.

It has been found in practice that, while the operation of the color killer circuit has been described as requiring a specific phase relationship of 180° between the burst and the continuous wave appearing at the lead 74, such an exact relationship is not critically necessary for the operation of a color killer tube. Rather, and as is desirable, the color killer tube may be rendered operative to "unkill" (i.e. enable) the chrominance bandpass amplifier when the burst and continuous wave are somewhat less than 180° displaced in phase. While the operation of the color killer is, therefore, not overly critical, the advantages of noise immunity and correlated action with the AFC circuit are still retained.

Having thus described my invention, what I claim as new and desire to secure by Letters Patent is:

1. In a color television receiver adapted to receive either a color television signal having luminance and chrominance components and, at repeated intervals, color subcarrier synchronizing bursts or a monochrome television signal lacking such bursts, said receiver having a chrominance channel for processing such chrominance signal components: means for producing a continuous reference subcarrier frequency wave; means associated with said wave-producing means for synchronizing said wave-producing means in such manner as to cause such continuous wave to have a fixed phase relative to such bursts; means for combining such continuous wave with such bursts in such manner as to produce a resultant wave which when such continuous wave is synchronized, is devoid of subcarrier frequency energy during each of such burst intervals; a color killer circuit comprising an electron discharge tube having an anode, a cathode and a control electrode and so connected to said chrominance channel that decreased conduction of said tube renders said channel operable while increased conduction of said tube renders said channel inoperable; and means for applying such resultant wave to said tube in such manner that conduction of said tube is increased during burst intervals when such resultant wave includes subcarrier wave energy during burst intervals and decreased during such intervals when such intervals are substantially devoid of subcarrier energy.

2. In a color television receiver adapted to receive either a color television signal having luminance and chrominance components and, during repeated intervals, color subcarrier frequency synchronizing bursts or a monochrome television signal lacking such bursts, said receiver having a chrominance channel for processing such chrominance signal components: means for producing a continuous reference subcarrier frequency wave; means for additively combining such continuous wave and such bursts to produce a resultant wave; an electron discharge tube having an anode, a cathode and a control electrode; a direct current load impedance in series with the anode-cathode discharge path of said tube; means for applying such resultant wave from said combining means between said control electrode and said cathode in such manner as to cause said tube to rectify such wave thereby to develop a cutoff bias; means associated with said tube for rendering it conductive during the intervals of such color synchronizing bursts; means connecting a point on said load impedance of said tube to said chrominance channel in such manner as to render the operability of said channel dependent upon the existence of a given voltage at said point on said impedance; and means in said receiver for synchronizing such wave-producing means with such bursts such that said resultant wave, when such synchronization is effectuated, is substantially devoid of subcarrier wave during each burst interval, whereby such cutoff bias is unaltered and the conduction of said tube is controlled in such manner that such given voltage is produced at said point on said impedance.

3. In a color television receiver adapted to receive either a composite color television signal having luminance and chrominance components and recurring color subcarrier synchronizing bursts or a composite monochrome television signal lacking said bursts, said receiver including a chrominance signal channel for processing said chrominance signal components; means for providing a continuous subcarrier frequency wave coupled to said chrominance signal channel for causing said chrominance signal channel to demodulate said chrominance signal components; means providing a color killer circuit coupled to said chrominance signal channel to control the operation thereof between a disabled condition substantially preventing processing of signals applied thereto and an enabled condition for processing said chrominance signal components; said color killer circuit including means for comparing the phase of said continuous subcarrier frequency wave with said color subcarrier synchronizing bursts to condition said color killer circuit to enable said chrominance signal channel when the signals occurring during the interval of said color subcarrier synchronizing bursts are in a predetermined phase relation with said continuous subcarrier frequency wave and to disable said chrominance signal channel when signals occurring during the color synchronizing burst interval are nonsynchronous with said continuous subcarrier frequency wave; means for applying the continuous subcarrier frequency wave from said continuous subcarrier frequency wave producing means to said color killer circuit phase comparing means; burst separator means coupled to receive at least a portion of said composite television signals received by said color television receiver for separating the portion of the signal occurring during the interval of said color subcarrier synchronizing bursts from the remainder of said signal and means for applying the separated signals occurring at the interval of said color subcarrier synchronizing bursts from said burst separating means to said color killer circuit phase comparison means; said color killer circuit phase comparison means comprising a phase comparing electron discharge device having an output electrode, said continuous wave applying means serving to apply the continuous subcarrier frequency wave from said continuous subcarrier frequency wave producing means to an input circuit of said phase comparing device, and said separated signals applying means serving to apply said separated signals from said burst separating means to an input circuit of said phase comparing device, and an output circuit for said phase comparing device including an output terminal direct current conductively connected to said phase comparing device output electrodes, said phase comparing device developing at said output terminal a control voltage of a first magnitude when the signals occurring during the interval of said color subcarrier synchronizing bursts are in a predetermined phase relation with said continuous subcarrier frequency wave, and developing at said output terminal a control voltage of a second magnitude when signals occurring during the color synchronizing burst interval are non-synchronous with said continuous subcarrier frequency wave; said chrominance signal channel including a chrominance signal component processing electron discharge device having an input electrode, said chrominance signal component processing device being responsive to a voltage at said input electrode such that it is enabled to process chrominance signal components when a voltage of said first magnitude is supplied to said input electrode and is disabled when a voltage of said second magnitude is supplied to said input electrode; and means comprising a direct current conductive connection between said input electrode and said output terminal for supplying the control voltage developed at said output terminal to said chrominance signal component processing device input electrode.

4. In a color television receiver of the type including a second detector adapted to provide a composite signal including luminance and chrominance components and recurrent color subcarrier synchronizing bursts during color television reception or a composite signal lacking said bursts during monochrome television reception, the combination comprising a chrominance signal channel coupled to said second detector and responsive to a control voltage of a first magnitude for processing said chrominance signal components, and responsive to a control voltage of a second magnitude to be effectively disabled; means coupled to said chrominance signal channel for providing a continuous subcarrier frequency wave for use in demodulating said chrominance signal components; phase comparison means for comparing the phase of said continuous subcarrier frequency wave and said color subcarrier synchronizing bursts and including means responsive to a synchronous relation between said wave and said bursts to produce a control voltage of said first magnitude, and responsive to a nonsynchronous relation between said wave and said bursts to produce a control voltage of said second magnitude; means for coupling said control voltage producing means to said chrominance signal channel to apply said control voltage thereto to control the operation of said chrominance signal channel between said enabled and said disabled conditions; means for applying the continuous subcarrier frequency wave from said continuous subcarrier frequency wave producing means to said phase comparing means; burst separator means coupled with said second detector for separating signals occurring during said color subcarrier synchrnizing burst interval from the remainder of the signals applied thereto; and means for applying the separated signals occurring during said burst interval to said phase comparison means said phase comparison means comprising a phase comparing tube having an output electrode, said continuous wave applying means serving to apply said continuous subcarrier frequency waves to an input circuit associated with said phase comparing tube, and said separated signal applying means serving to apply said color subcarrier synchronizing bursts to an input circuit associated with said phase comparing tube; said control voltage producing means comprising an output circuit for said phase comparing tube, said output circuit including an output terminal direct current conductively connected to said output electrode such that a control voltage of said first magnitude appears at said output terminal in response to a synchronous relation between said applied continuous subcarrier frequency wave and said applied color subcarrier synchronizing bursts, and a control voltage of said second magnitude appears at said output terminal in response to a non-synchronous relation between said applied wave and said applied bursts; said chrominance signal channel comprising a chrominance amplifier tube having an input electrode, said chrominance amplifier tube being enable to amplify said chrominance signal components when a voltage of said first magnitude is applied to said input electrode, and being effectively disabled when a voltage of said second magnitude is applied to said input electrode; said control voltage applying means coupling said control voltage producing means to said chrominance signal channel comprising a direct current conductive connection between said input electrode and said output terminal.

References Cited in the file of this patent

UNITED STATES PATENTS

| | | |
|---|---|---|
| 2,681,379 | Schroeder | June 15, 1954 |
| 2,736,765 | Lohman | Feb. 28, 1956 |
| 2,759,993 | Loughlin | Aug. 21, 1956 |
| 2,790,846 | Keizer | Apr. 30, 1957 |

OTHER REFERENCES

RCA Service Data for Color TV Receiver Model CT-100.